US010875125B2

(12) United States Patent
Narayanan et al.

(10) Patent No.: US 10,875,125 B2
(45) Date of Patent: Dec. 29, 2020

(54) MACHINE LEARNING FOR WELDMENT CLASSIFICATION AND CORRELATION

(71) Applicant: Lincoln Global, Inc., Santa Fe Springs, CA (US)

(72) Inventors: Badri K. Narayanan, Highland Hts., OH (US); John R. Procario, Strongsville, OH (US); Michael A. Kottman, Cleveland, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 320 days.

(21) Appl. No.: 15/627,867

(22) Filed: Jun. 20, 2017

(65) Prior Publication Data
US 2018/0361514 A1 Dec. 20, 2018

(51) Int. Cl.
*B23K 31/12* (2006.01)
*B23K 9/095* (2006.01)
(Continued)

(52) U.S. Cl.
CPC .......... *B23K 31/125* (2013.01); *B23K 9/0953* (2013.01); *B25J 9/163* (2013.01); *G06N 20/00* (2019.01); *B23K 31/12* (2013.01)

(58) Field of Classification Search
CPC .................................................. B23K 31/125
See application file for complete search history.

(56) References Cited

U.S. PATENT DOCUMENTS 5,283,418 A * 2/1994 Bellows ............... B23K 31/006
 219/130.01
5,621,811 A 4/1997 Roder
(Continued)

FOREIGN PATENT DOCUMENTS

CN 101908083 B 8/2012
CN 103 020 638 B 9/2015
(Continued)

OTHER PUBLICATIONS

A. Sumesh et al. "Use of Machine Learning Algorithms for Weld Quality Monitoring using Acoustic Signature" (www.sciencedirect.com/science/article/pii/S1877050915005438) Procedia Computer Science 50 (2015) pp. 316-322 (7 pages).
(Continued)

*Primary Examiner* — Raymond L Nimox
(74) *Attorney, Agent, or Firm* — David J. Muzilla (57) ABSTRACT

Embodiments of systems and methods for characterizing weldments are disclosed. One embodiment includes a method of generating an algorithm for classifying weldments as meeting or not meeting a specification. Training data is read by a machine learning system. The training data includes cross-sectional images of training weldments, truth data indicating whether the training weldments meet the specification or not, and training weld data associated with creating the training weldments. The machine learning system trains up an algorithm using the training data such that the resultant algorithm can classify a subsequent test weldment as meeting the specification or not meeting the specification when a cross-sectional image of the test weldment and test weld data used to create the test weldment are read and processed by the classification algorithm as trained.

19 Claims, 9 Drawing Sheets

TRAINING PROCESS (51) Int. Cl.
*B25J 9/16* (2006.01)
*G06N 20/00* (2019.01)

(56) References Cited

U.S. PATENT DOCUMENTS

| | | | | |
|---|---|---|---|---|
| 6,857,553 | B1* | 2/2005 | Hartman | B23K 20/121 228/103 |
| 7,516,022 | B2 | 4/2009 | Lee | |
| 2003/0234239 | A1* | 12/2003 | Lee | B23K 11/24 219/109 |
| 2004/0034608 | A1* | 2/2004 | de Miranda | B23K 9/093 706/16 |
| 2009/0200281 | A1* | 8/2009 | Hampton | B23K 9/0953 219/130.33 |
| 2009/0200282 | A1* | 8/2009 | Hampton | B23K 9/0953 219/130.33 |
| 2013/0248505 | A1* | 9/2013 | Anayama | B23K 11/115 219/130.01 |
| 2014/0236874 | A1 | 8/2014 | Abell et al. | |
| 2017/0028499 | A1 | 2/2017 | Yoshida | |
| 2017/0032281 | A1* | 2/2017 | Hsu | B23K 9/0953 |
| 2018/0341248 | A1* | 11/2018 | Mehr | G05B 19/4099 |

FOREIGN PATENT DOCUMENTS

| | | |
|---|---|---|
| CN | 105938563 A | 9/2016 |
| EP | 2 784 734 A1 | 10/2014 |
| WO | 2012/000648 A1 | 1/2012 |
| WO | 2016124818 A1 | 8/2016 |

OTHER PUBLICATIONS

Min Xu et al. "Image Processing Method for Weld Quality Inspection System of Tailored Blanks Laser Welding" (www.computer.org/csdl/proceedings/icmtma/2010/3962/02/3962c422-abs.html) Sixth International Conference on Measuring Technology and Mechatronics Automation, China, Mar. 13-14, 2010, pp. 422-426 (5 pages).

I.U. Abhulimen et al. "Application of Artificial Neural Network in Predicting the Weld Quality of a Tungsten Inert Gas Welded Mild Steel Pipe Joint" (www.ijstr.org/final-print/jan2014/Application-Of-Artificial-Neural-Network-In-Predicting-The-Weld-Quality-Of-A-Tungsten-Inert-Gas-Welded-Mild-Steel-Pipe-Joint.pdf) International Journal of Scientific & Technology Research vol. 3, Issue 1, Jan. 2014, pp. 277-285 (9 pages).

Extended European Search Report from Corresponding Application No. EP18178751.6; dated Nov. 16, 2018; pp. 1-7.

* cited by examiner

Bend Test

Tensile Test

Break Test

Classify a Test Weldment

MACHINE LEARNING FOR WELDMENT CLASSIFICATION AND CORRELATION

FIELD

Embodiments of the present invention relate to systems and methods associated with welding. More specifically, embodiments of the present invention relate to systems and methods for characterizing and correlating weldments, employing machine learning techniques, which can be created using a set of welding parameters and following a welding procedure.

BACKGROUND

Conventionally, when a welding procedure specification (WPS) document is generated for making quality welds in accordance with code requirements, the WPS is supported by a procedure qualification record (PQR). The PQR is a record for a weld that was created and rigorously tested to make sure that the welding procedure used (in accordance with the WPS) will produce a quality weld. The PQR typically contains variables or parameters recorded during the welding procedure when creating the weld, along with test results of tests performed on the weld afterwards. The variables or parameters may be related to, for example, a joint type, electrical characteristics, a base metal, a filler metal, a shielding type, preheating/interpass, and welding parameters (e.g., current, voltage, travel speed, wire feed speed, electrode diameter). The tests performed may include, for example, a visual examination, a tensile/tension test, a bend test, a hardness test, a Charpy impact test, a macroetch test, a torque test, a peel test, a Nick break test, a radiography test, or an ultrasonic test. Some of these tests are mechanically intensive tests that take a lot of time to conduct and may be destructive to the welded part. There is a desire to be able to more quickly and easily hone in on variables or parameters that will result in quality welds and characterize a quality weld in accordance with code requirements before going through all of the trouble of performing the mechanical testing.

SUMMARY

Embodiments of the present invention include systems and methods related to machine learning to, for example, classify weldments as meeting or not meeting one or more specifications. The term "weldment", as used herein, refers to an assembly whose component parts are joined by laying down one or more weld beads by welding. Therefore, a weldment can have one or more weld beads. A machine learning system is able to learn from data and generate algorithms (models) that can classify and make predictions on data. Algorithms or models (e.g. classification algorithms or models) are generated (trained) by inputting training data associated with weldments (e.g., image data, weld data, test result data, truth data) into a machine learning system which is structured to produce an algorithm or model for yielding a particular type of result. When the trained algorithm is subsequently presented with test data as input, the trained algorithm yields output data associated with the particular type of result. For example, in one embodiment, the trained algorithm may classify a test weldment as meeting a particular specification or not meeting the particular specification (e.g., at a determined or specified probability) when presented with a cross-sectional image of the test weldment (showing the internal grain structure of the test weldment) and a record of test weld data that was used to create the test weldment. Other algorithms may be trained to produce other output results when presented with other types of input data, in accordance with other embodiments. The term algorithm and model are used interchangeably herein.

One embodiment includes a method of generating an algorithm or model. The method includes a machine learning system reading training data. The training data includes at least one training cross-sectional image for each of a plurality of training weldments, where each training cross-sectional image reveals an internal grain structure of a corresponding training weldment. The training data also includes at least one record of training weld data associated with creating each weldment of the plurality of training weldments, and (optionally) at least one record of test result data associated with testing one or more weldments of the plurality of training weldments. The training weld data may include, for example, joint type data, current type data, transfer mode data, base metal data, filler metal data, shielding data, preheat/interpass data, and welding parameter data. The welding parameter data may include, for example, welding electrode data, welding current data, welding voltage data, wire feed speed data, electrical stickout data, welding waveform data, weave width data, travel speed data, or welding procedure data. The test result data may include, for example, bend test data, hardness test data, tensile test data, impact test data, weld metal chemical analysis data, macroetch test data, torque test data, peel test data, break test data, radiography test data, or ultrasonic test data. The training data further includes truth data, for each training weldment of the plurality of training weldments, indicating that the training weldment meets a specification or does not meet the specification. In one embodiment, the specification includes at least one of a strength specification, a ductility specification, a hardness specification, a toughness specification, or a percent refinement of bead grain structure specification. The training cross-sectional image, the training weld data, the test result data, and the truth data for each training weldment of the plurality of training weldments are associated with each other within the machine learning system as at least one digital record, stored in a memory, representing a corresponding training weldment. The method also includes training a classification algorithm using the training data for all or some of the plurality of training weldments.

In accordance with various embodiments, the machine learning system may employ, for example, a supervised learning approach, an unsupervised learning approach, or a reinforcement learning approach to train the algorithm (model). In accordance with various embodiments, learning approaches may include, for example, one or more of a linear regression technique, a logistic regression technique, a decision tree technique, a K-Nearest Neighbor technique, a K-means technique, a genetic algorithm technique, an evolutionary algorithm technique, a Gradient Boosting technique, or an AdaBoost technique. Other learning approaches are possible as well, in accordance with other embodiments. In accordance with various embodiments, a machine learning system may employ a support vector machine, a tensor processing unit, a graphics processing unit, an artificial neural network, a Bayesian network, or a learning classifier system, for example.

In one embodiment, the algorithm is a classification algorithm that is trained to classify a test weldment as meeting the specification or not meeting the specification when a test cross-sectional image of the test weldment and test weld data used to create the test weldment are read as input and processed by the classification algorithm as trained. The classification algorithm may also be trained to generate a probability of the test weldment meeting the specification or not meeting the specification. The test weld data may include, for example, joint type data, current type data, transfer mode data, base metal data, filler metal data, shielding data, preheat/interpass data, and welding parameter data. The welding parameter data may include, for example, welding electrode data, welding current data welding voltage data, wire feed speed data, electrical stickout data, welding waveform data, weave width data, travel speed data, or welding procedure data.

In one embodiment, the algorithm is a classification algorithm that is trained to classify a sample set of weld data for creating a sample weldment. When the sample set of weld data is read as input and processed by the classification algorithm as trained, the classification algorithm classifies the sample set of weld data as resulting in a sample weldment that would meet the specification or would not meet the specification were the sample set of weld data used to create the sample weldment. The classification algorithm may also be trained to generate a probability that the sample set of weld data would result in the sample weldment meeting the specification or not meeting the specification. The sample set of weld data may include, for example, joint type data, current type data, transfer mode data, base metal data, filler metal data, shielding data, preheat/interpass data, and welding parameter data. The welding parameter data may include, for example, welding electrode data, welding current data welding voltage data, wire feed speed data, electrical stickout data, welding waveform data, weave width data, travel speed data, or welding procedure data.

In one embodiment, the algorithm is trained to determine, when at least one image of a cross section of a test weldment is read as input and processed by the algorithm, at least one new record of test weld data that could have been used to create the test weldment. The algorithm may also be trained to generate a probability that the test weldment meets the specification or does not meet the specification. The new record of test weld data may include, for example, joint type data, current type data, transfer mode data, base metal data, filler metal data, shielding data, preheat/interpass data, and welding parameter data. The welding parameter data may include, for example, welding electrode data, welding current data welding voltage data, wire feed speed data, electrical stickout data, welding waveform data, weave width data, travel speed data, or welding procedure data.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of systems and methods for characterizing or correlating weldments are disclosed. In one embodiment, a classification algorithm is trained to classify a weldment as meeting or not meeting a specification when at least one cross-sectional image of the weldment and at least one record of weld data used to create the weldment are presented to the classification algorithm as input. In another embodiment, a classification algorithm is trained to classify a sample set of weld data, when presented to the classification algorithm as trained, as resulting in a sample weldment that would or would not meet a specification were the sample set of weld data to be used to create the sample weldment. In still another embodiment, an algorithm is trained to determine, when presented with at least one image of a cross section of a weldment, at least one new record of weld data that could have been used to create the weldment (i.e., correlate the weldment to weld data).

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 graphically illustrates one embodiment of using a machine learning system 100 employing a training approach 101 to generate an algorithm 102 by reading training data into a machine learning system 100 and "training up" the algorithm 102 on the training data using the training approach 101.

Figure 1:
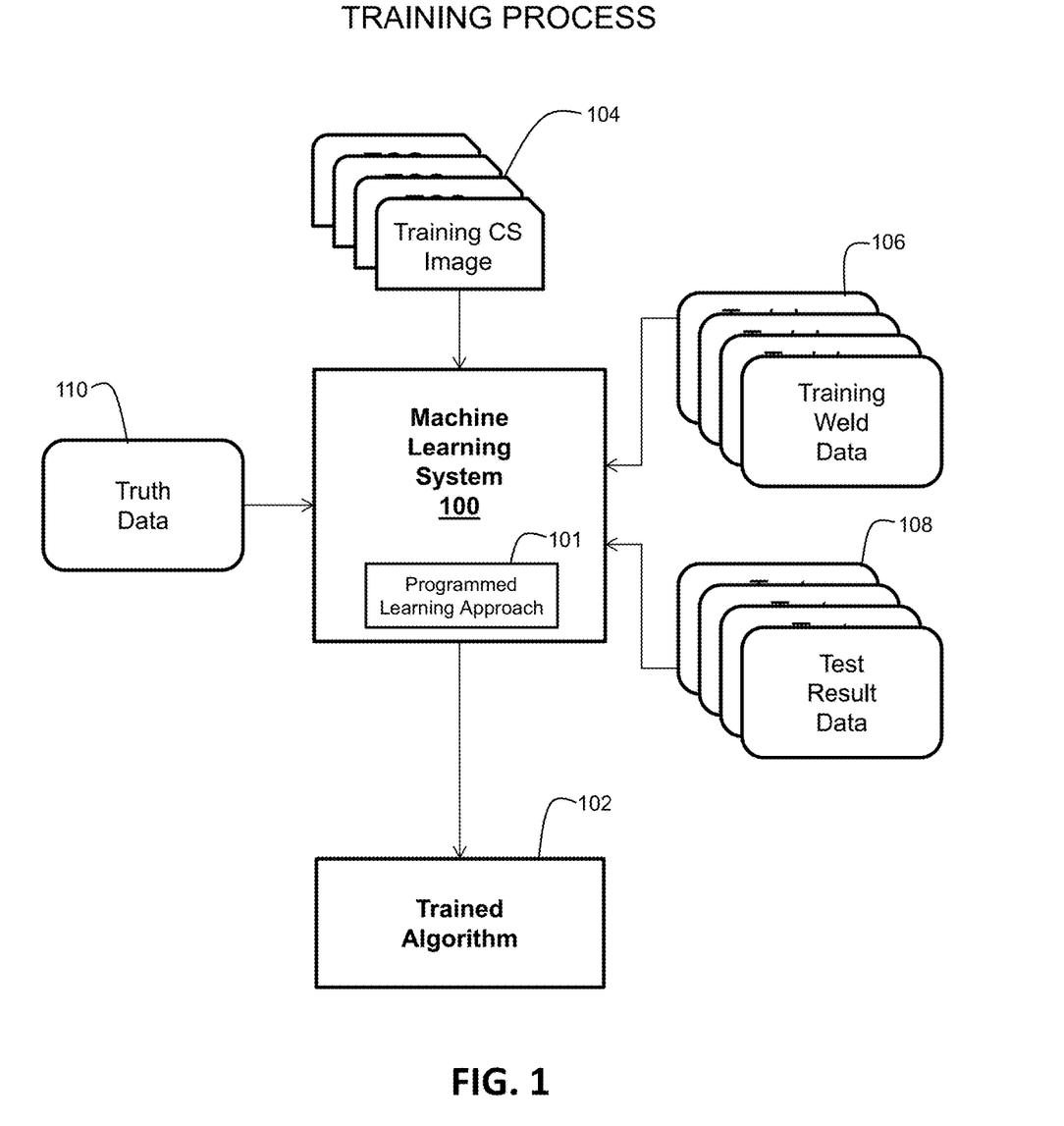
FIG. 1 graphically illustrates an embodiment of generating an algorithm or model by reading training data into a machine learning system and training up the algorithm or model on the training data.

Referring to FIG. 1, the training data includes images 104 (image data) of cross sections of training weldments (referred to in FIG. 1 as Training CS Images). The training weldments are actual weldments that were created using a welding system. The weldments may be created manually by a human using a manual welding system, or by a robotic welding system, for example. These weldments are referred to as training weldments because data associated with these weldments are used to "train" or "train-up" an algorithm 102. The images 104 (a first portion of the training data) may be obtained by cutting each training weldment along a cross section and using a digital camera or a laser scanner, for example, to acquire an image of the cross section. Each image shows an internal grain structure of a corresponding training weldment. The internal grain (crystal) structure of a weldment is related to the quality of the weldment.

The training data also includes training weld data 106 which is associated with creating the training weldments. The training weld data 106 (a second portion of the training data) may include, for example, one or more of joint type data, current type data, transfer mode data, base metal data, filler metal data, shielding data, preheat/interpass data, and welding parameter data for each of the training weldments, in accordance with various embodiments. The welding parameter data may include, for example, one or more of welding electrode data, welding current data, welding voltage data, wire feed speed data, electrical stickout data, welding waveform data, weave width data, travel speed data, or welding procedure data, in accordance with various embodiments.

In one embodiment, when a weldment includes only one weld bead (or multiple weld beads of the same type), the training weld data for the weldment may simply be the weld data that was used to create a weld bead. When the weld beads are of different types, the training weld data for a weldment may include weld data for each of multiple weld beads of the weldment, in accordance with one embodiment. The training weld data for a weldment may include weld data that is based on an average and/or a standard deviation of weld data of multiple weld beads of the weldment, in accordance with another embodiment. The training weld data for a weldment may include weld data for only one weld bead of a weldment having multiple different weld beads, in accordance with yet another embodiment. Other embodiments, taking into account training weld data in different ways, are possible as well.

The training data may also include test result data 108 which is associated with physically testing the training weldments after being created. The test result data 108 (an optional third portion of the training data) includes the test results from performing one or more of, for example, the following types of tests on at least a portion of the training weldments: a bend test, a hardness test, a tensile test, an impact test, a weld metal chemical analysis, a macroetch test, a torque test, a peel test, a break test, a radiography test, or an ultrasonic test. Other types of tests and associated test result data are possible as well, in accordance with other embodiments. The test result data 108 for a training weldment may be used to determine whether or not the training weldment meets a specification (e.g. a strength specification, a ductility specification, a hardness specification, a toughness specification, a percent refinement of bead grain structure specification, or other specifications). The strength specification may be related to an amount of force necessary for a metal to deform. Types of strengths may include, for example, a tensile strength, a yield strength, a compressive strength, a shear strength, a fatigue strength, or an impact strength. The ductility specification may be related to the ability of a metal to withstand tensile stress (a force pulling two ends of a metal away from each other). The hardness specification may be related to the ability of a metal to resist friction (e.g., abrasion resistance). The toughness specification may be related to the ability of a metal to resist fracturing when a force is applied. Toughness requires strength and ductility. The percent refinement of bead grain structure specification may be related to a bead grain (crystal) structure size relative to a defined or standard bead grain (crystal) structure size.

The training data also includes truth data 110 which indicates, for each training weldment, whether or not the training weldment meets the specification. For example, the truth data 110 for a training weldment may be a logical "1" indicating that the specification is met by the training weldment, or a logical "0" indicating that the specification is not met by the training weldment. In accordance with one embodiment, the truth data may also indicate by "how much" a training weldment meets or does not meet the specification (e.g., exceeds meeting the specification by 10%, or falls short of meeting the specification by 15%). The final trained algorithm 102 does not exist until the machine learning system 100, using the training data, generates (i.e., "trains-up") the algorithm 102. However, in some embodiments, an initial algorithm may be programmed within the machine learning system 100 as a "seed" which is modified by the training process.

Figure 2:
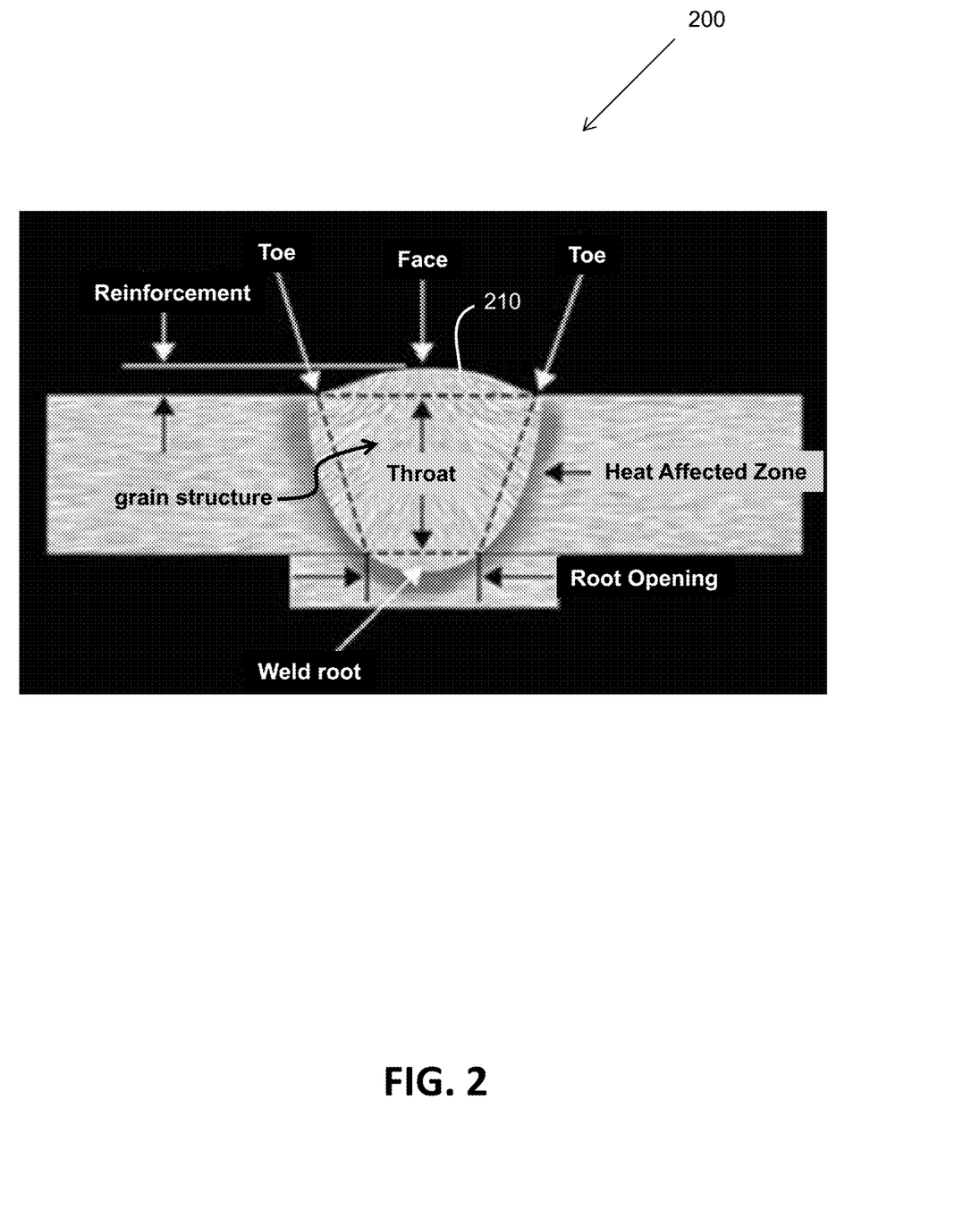
FIG. 2 graphically illustrates an embodiment of a cross-sectional view of a groove weld of a weldment with internal grain structure.
Figure 3:
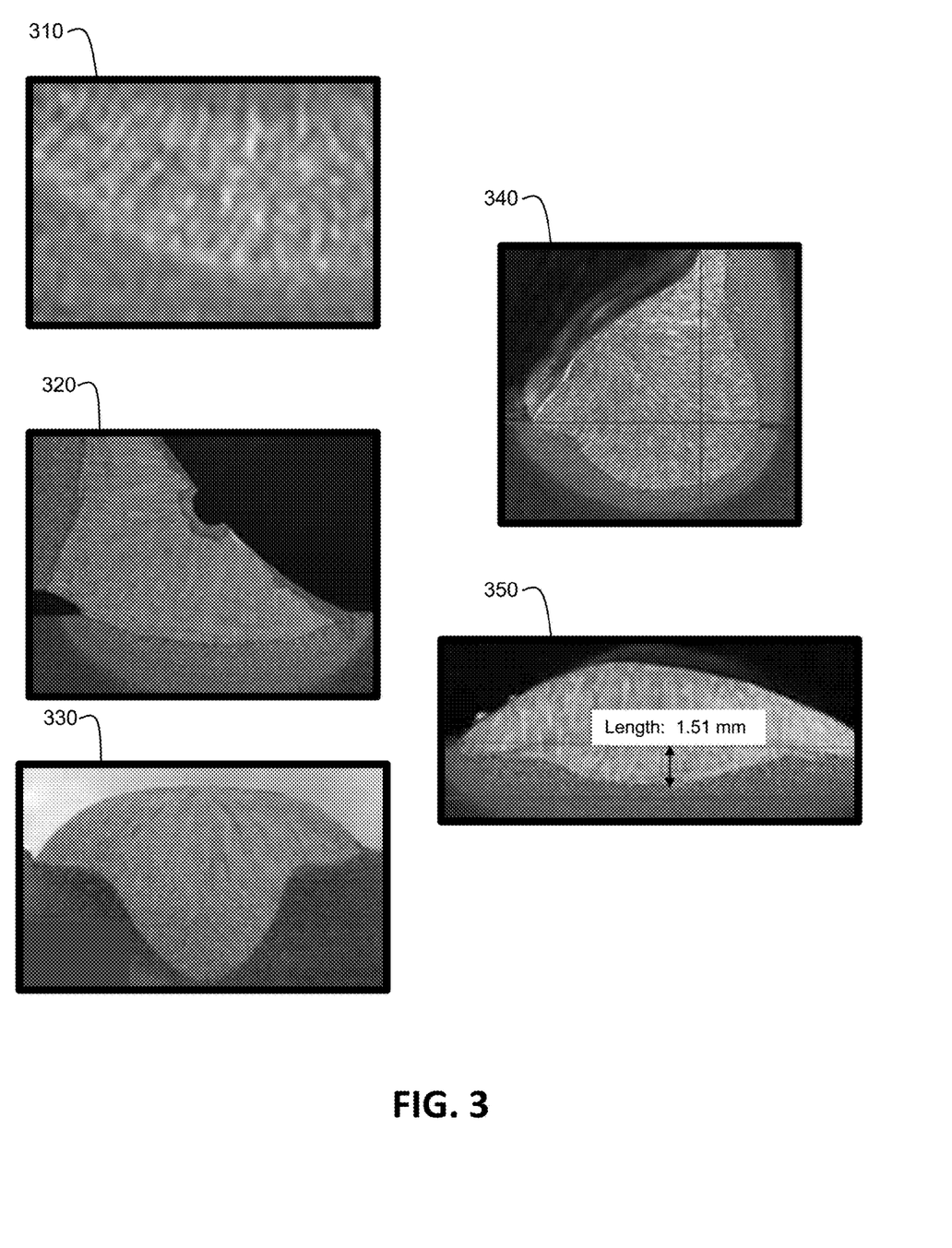
FIG. 3 illustrates several embodiments of cross-sectional images of weldments showing an internal grain structure.

FIG. 2 graphically illustrates an embodiment of a cross-sectional view of a groove weldment 200 having a weld bead 210 with an internal grain structure. Proper weld strength for the groove weldment 200 is achieved by having complete weld fusion and by using the correct strength filler metal (i.e., one that is of at least matching strength to the base metal, not by the penetration into the base plates). The internal grain structure of a weldment can be a key indicator of the quality of the weldment. Grain structure may be fine or coarse where, in general, a finer grain structure indicates a stronger, higher quality weld. FIG. 3 illustrates several embodiments of cross-sectional images (310-350) of various types of weldments each showing an internal grain structure. Such cross-sectional images may be obtained by cutting each training weldment along a cross section and using a digital camera or a laser scanner, for example, to acquire an image of the cross section. The cross-sectional images may be read by the machine learning system 100 of FIG. 1 as a first portion of the training data (Training CS Images 104), for example.

Figure 4:
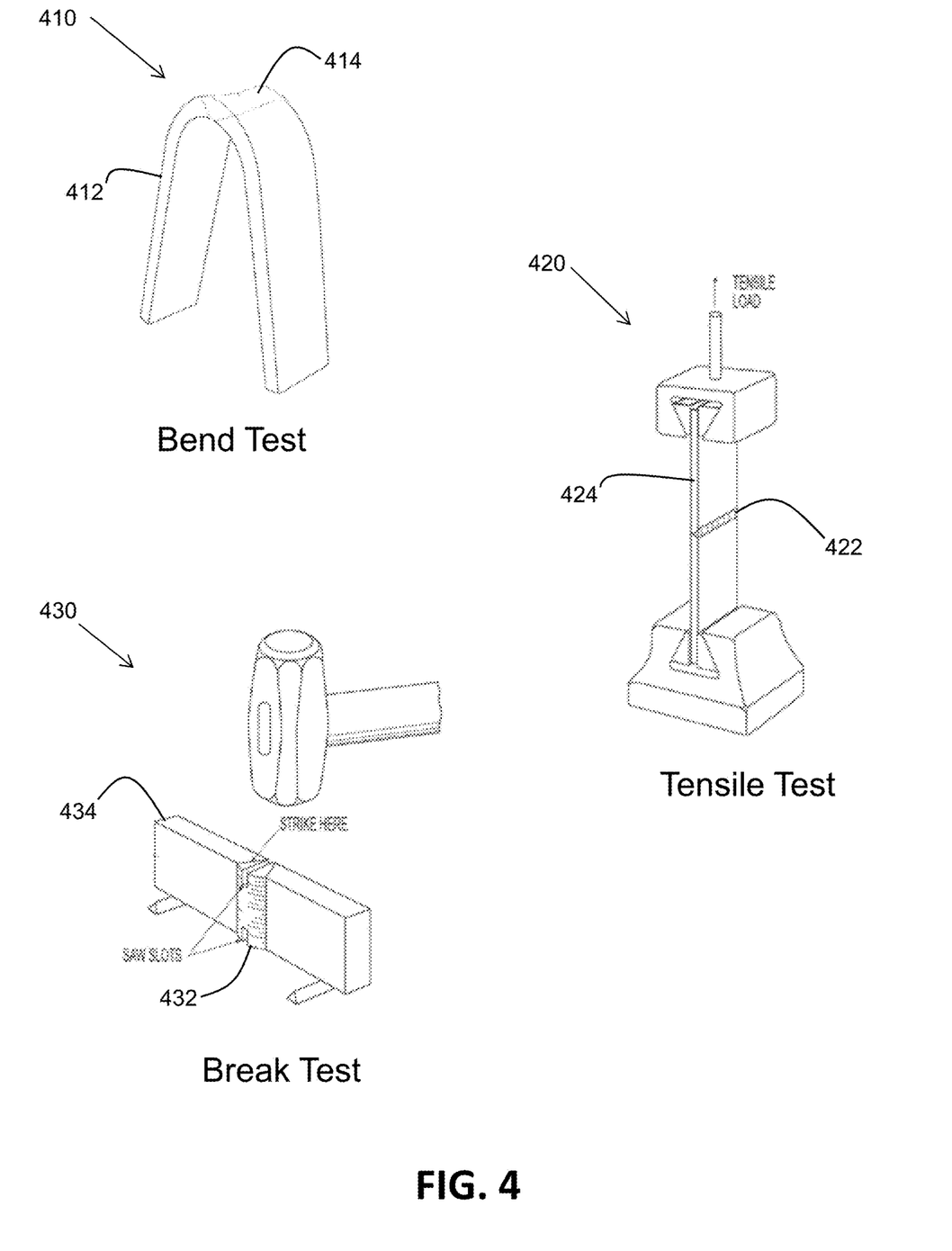
FIG. 4 illustrates several embodiments of mechanical tests that may be performed on a weldment to yield test result data.

Again, referring to FIG. 1, the training data can include the test result data 108 which is associated with physically testing the training weldments after being created. A test may be a non-destructive test (which leaves the welded structure intact) or a destructive test (which destroys the welded structure). FIG. 4 illustrates several embodiments of mechanical tests that may be performed on a welded structure having a weldment to yield at least a portion of the test result data 108. The tests illustrated in FIG. 4 are destructive tests which include a bend test 410, a tensile (pull) test 420, and a break test 430.

Referring to FIG. 4, a straight cut section of a weldment 412 having a weld joint 414 (with a weld bead) is subject to the bend test 410. The bend test 410 may be performed to find various weld properties such as ductility of the welded zone (including the weld bead), weld penetration, fusion, crystalline (grain) structure (of the fractured surface), and strength. The bend test 410 helps determine the quality of the weld metal, the weld junction, the weld bead, and the heat affected zone. Any cracking of the metal during the bend test 410 indicates poor fusion, poor penetration, or some other condition that can cause cracking. Stretching of the metal helps indicate the ductility of the weldment. A fractured surface reveals the crystalline or grain structure of the weldment. Larger crystals tend to indicate a defective welding procedure or inadequate heat treatment after welding. A quality weldment has small crystals (i.e., a smaller grain structure).

The tensile (or pull) test 420 may be performed to find the strength of a welded joint 422 (including a weld bead). During the test, the weldment 424 is held on one end and pulled on the other end until the weldment 424 breaks. The tensile load or pull, at which the weldment 424 breaks, is determined and may be compared to a standard measure for pass/fail determination.

The break test 430 (e.g., a nick break test) may be performed to determine if the weld metal of a welded butt joint 432 (including a weld bead) of a weldment 434 has any internal defects such as, for example, slag inclusion, gas pockets, poor fusion, and oxidized metal. A slot is cut into each side of the welded joint 432. The weldment 434 is positioned across two supports and struck with a hammer until the section of the weld between the slots fractures. The internal metal of the weldment may be inspected for defects. Defects may be compared to standard measures for pass/fail determination. As stated previously herein, other types of tests that yield other types of test result data are possible as well including, for example, a hardness test, an impact test, a weld metal chemical analysis, a macroetch test, a torque test, a peel test, a radiography test, or an ultrasonic test.

Once a destructive test is performed on a weldment, other tests may not be able to be performed on that same weldment. However, other weldments having the same (or at least extremely similar) characteristics as a destroyed weldment can be created using the same weld data and welding procedure such that other tests may be performed. Then at least a portion of the test result data can be correlated to that type of weldment to partially represent training weldments for training an algorithm 102 using the machine learning system 100 of FIG. 1.

Figure 5:
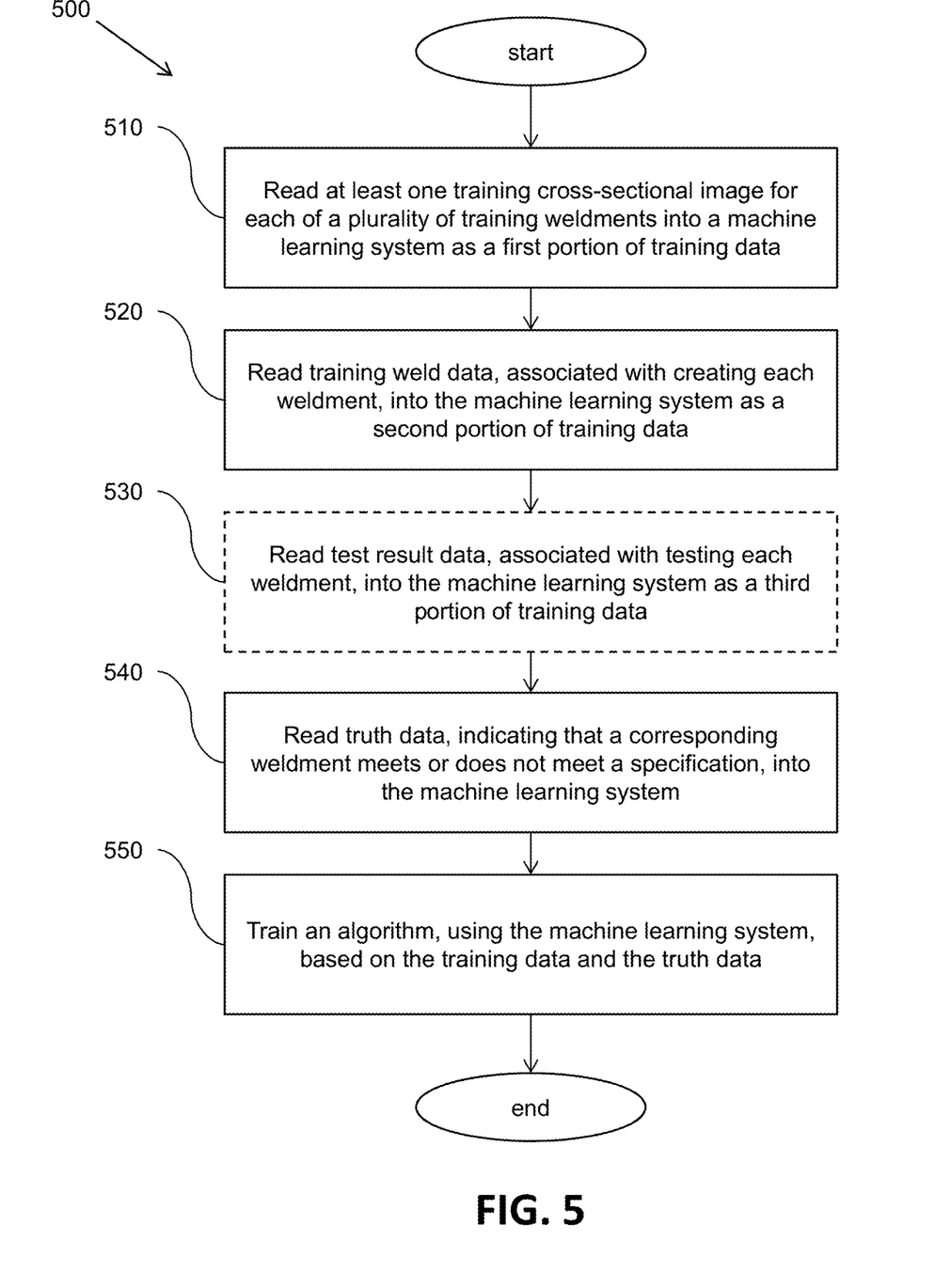
FIG. 5 illustrates a flowchart of an embodiment of a method for generating an algorithm in accordance with the embodiment of FIG. 1.

FIG. 5 illustrates a flowchart of an embodiment of a method 500 for generating an algorithm in accordance with the embodiment of FIG. 1. Different types of algorithms may be generated, depending on the intended purpose or purposes of the resulting algorithm. Referring to the method 500 of FIG. 5, a machine learning system 100 reads training data and trains an algorithm using the training data. At 510, the machine learning system 100 reads at least one training cross-sectional image (a first type of training data) for each of a plurality of training weldments, where each training cross-sectional image reveals an internal grain structure of a corresponding training weldment. Again, FIG. 3 herein shows some examples of cross-sectional images of weldments. At 520, the machine learning system 100 reads at least one record of training weld data (a second type of training data) associated with creating each weldment of the plurality of training weldments. The training weld data may include, for example, joint type data, current type data, transfer mode data, base metal data, filler metal data, shielding data, preheat/interpass data, and welding parameter data. The welding parameter data may include, for example, welding electrode data, welding current data, welding voltage data, wire feed speed data, electrical stickout data, welding waveform data, weave width data, travel speed data, or welding procedure data.

At 530, the machine learning system 100 reads test result data (an optional third type of training data) associated with testing each weldment of the plurality of training weldments. The test result data may include, for example, bend test data, hardness test data, tensile test data, impact test data, weld metal chemical analysis data, macroetch test data, torque test data, peel test data, break test data, radiography test data, or ultrasonic test data. At 540, the machine learning system 100 reads truth data (a fourth type of training data), for each training weldment of the plurality of training weldments, indicating that the training weldment meets a specification or does not meet the specification. The specification may include, for example, at least one of a strength specification, a ductility specification, a hardness specification, a toughness specification, or a percent refinement of bead grain structure specification. Other types of specifications are possible as well, in accordance with other embodiments. The training cross-sectional image, the training weld data, the test result data (optional), and the truth data for each training weldment of the plurality of training weldments are associated with each other within the machine learning system as at least one digital record, stored in a memory, representing a corresponding training weldment, in accordance with one embodiment.

At 550, the machine learning system 100 trains an algorithm using the training data. Again, different types of algorithms may be generated, depending on the intended purpose or purposes of the resulting algorithm. The training of an algorithm (or model) is driven by a learning approach programmed within the machine learning system 100. Some learning approaches include, for example, one or more of a linear regression technique, a logistic regression technique, a decision tree technique, a K-Nearest Neighbor technique, a K-means technique, a genetic algorithm technique, an evolutionary algorithm technique, a Gradient Boosting technique, or an AdaBoost technique. Other learning approaches are possible as well, in accordance with other embodiments. The machine learning system 100 may employ, for example, a support vector machine, a tensor processing unit, a graphics processing unit, an artificial neural network, a Bayesian network, or a learning classifier system, in accordance with various embodiments, to execute a learning approach.

For example, in one embodiment, a learning approach 101 may be programmed within the machine learning system 100 to train an algorithm to classify a weldment as meeting a specification or not meeting a specification when the algorithm is presented with input data related to the weldment. In another embodiment, a learning approach 101 may be programmed within the machine learning system 100 to train an algorithm to classify that a sample (e.g., experimental) set of weld data could be used to result in a weldment that would meet a specification or not meet a specification when the algorithm is presented with the sample set of weld data as input data. In yet another embodiment, a learning approach 101 may be programmed within the machine learning system 100 to train an algorithm to determine a set of weld data that could have been used to create a weldment when the algorithm is presented with input data related to the weldment. Other types of algorithms are possible as well, in accordance with other embodiments. In accordance with one embodiment, an algorithm (or model) trained (generated) by the machine learning system 100 is in the form of a set of computer-executable instructions stored in a memory and capable of being executed by a processor.

In accordance with one embodiment, an algorithm (or model) that has been trained (generated) by the machine learning system 100 can be verified on a separate set of verification data to verify how well the algorithm performs with respect to an intended purpose of the algorithm. In this manner, if a trained algorithm does not perform well enough (as defined by, for example, the algorithm developer), additional and/or different training data can be used to re-train the algorithm in an attempt to achieve acceptable performance.

Figure 6:
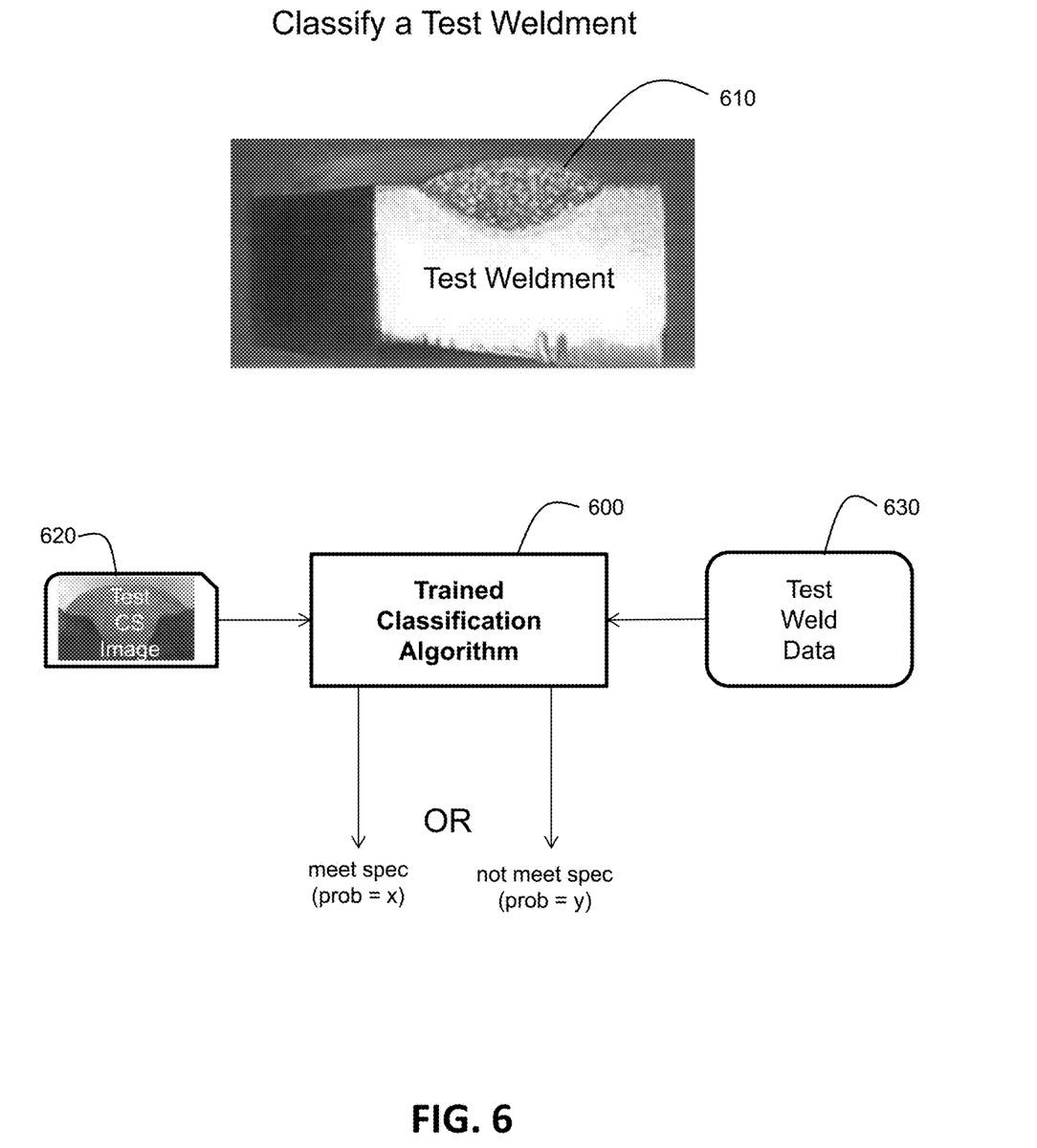
FIG. 6 graphically illustrates an embodiment of a trained classification algorithm or model trained for classifying a test weldment as meeting or not meeting a specification.

FIG. 6 graphically illustrates an embodiment of a trained classification algorithm 600 trained for classifying a test weldment 610 as meeting or not meeting a specification using the training process of FIG. 1. In accordance with one embodiment, the machine learning system 100 includes a learning approach 101 that is programmed to drive the machine learning system 100 to generate the classification algorithm 600 by training on the training data for a plurality of training weldments. The classification algorithm 600 is trained to classify a test weldment as meeting the specification or not meeting the specification when at least one test cross-sectional image 620 of the test weldment 610 and at least one record of test weld data 630 used to create the test weldment 610 are read as input and processed by the classification algorithm 600 as trained. The specification may be, for example, one of a strength specification, a ductility specification, a hardness specification, a toughness specification, or a percent refinement of bead grain structure specification. In this manner, a weldment can be tested with respect to meeting or not meeting a specification without performing physical tests.

In one example, based on the test cross-sectional image 620 and the test weld data 630, the classification algorithm 600 may classify the test weldment 610 as likely meeting a strength specification with a probability of 85%. In another example, based on another test cross-sectional image and another set of test weld data for another test weldment, the classification algorithm 600 may classify the other test weldment as likely not meeting the strength specification with a probability of 70%.

Figure 7:
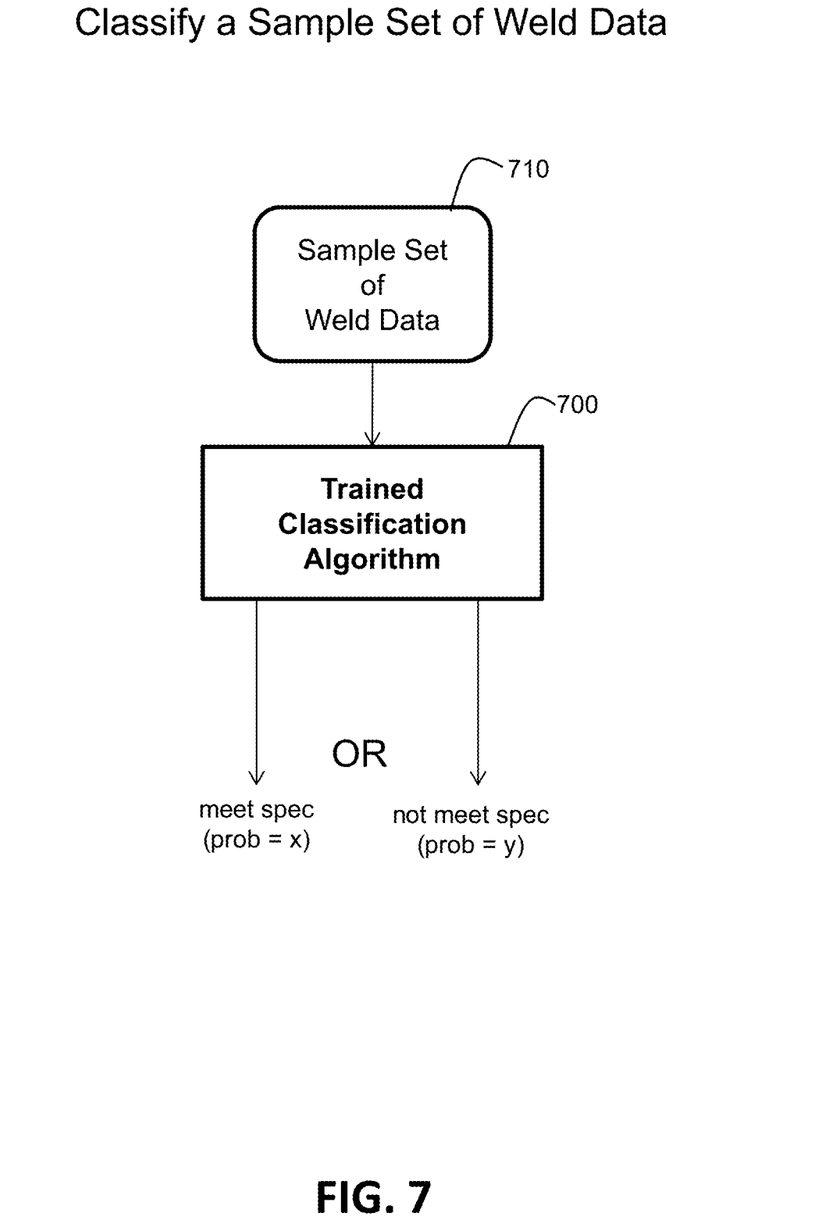
FIG. 7 graphically illustrates an embodiment of a trained classification algorithm or model trained for classifying a sample set of weld data as being capable of resulting in a weldment that would or would not meet a specification when used to create the weldment.

FIG. 7 graphically illustrates an embodiment of a trained classification algorithm 700 trained for classifying a sample set of weld data 710 as being capable of resulting in a weldment that would or would not meet a specification when used to create the weldment. In accordance with one embodiment, the machine learning system 100 includes a learning approach 101 that is programmed to drive the machine learning system 100 to generate the classification algorithm 700 by training on the training data for a plurality of training weldments. The classification algorithm 700 is trained to classify a sample set of weld data 710 for creating a sample weldment, when read as input and processed by the classification algorithm 700 as trained. The sample set of weld data is classified as resulting in a sample weldment that would meet the specification or would not meet the specification were the sample set of weld data used to create the sample weldment. The sample set of weld data 710 may be experimentally generated, for example, by a researcher trying to create a higher quality weld. Again, the specification may be, for example, one of a strength specification, a ductility specification, a hardness specification, a toughness specification, or a percent refinement of bead grain structure specification. In this manner, a set of weld data that meets a specification can be honed in on before actually creating an actual weldment, based on the sample set of weld data, and before performing physical tests on the actual weldment.

In one example, based on the sample set of weld data 710, the classification algorithm 700 may classify the sample set of weld data 710 as likely resulting in a weldment that would meet a ductility specification with a probability of 95%. In another example, based on another sample set of weld data for another test weldment, the classification algorithm 700 may classify the other test weldment as likely not resulting in a weldment that would meet the ductility specification with a probability of 80%.

Figure 8:
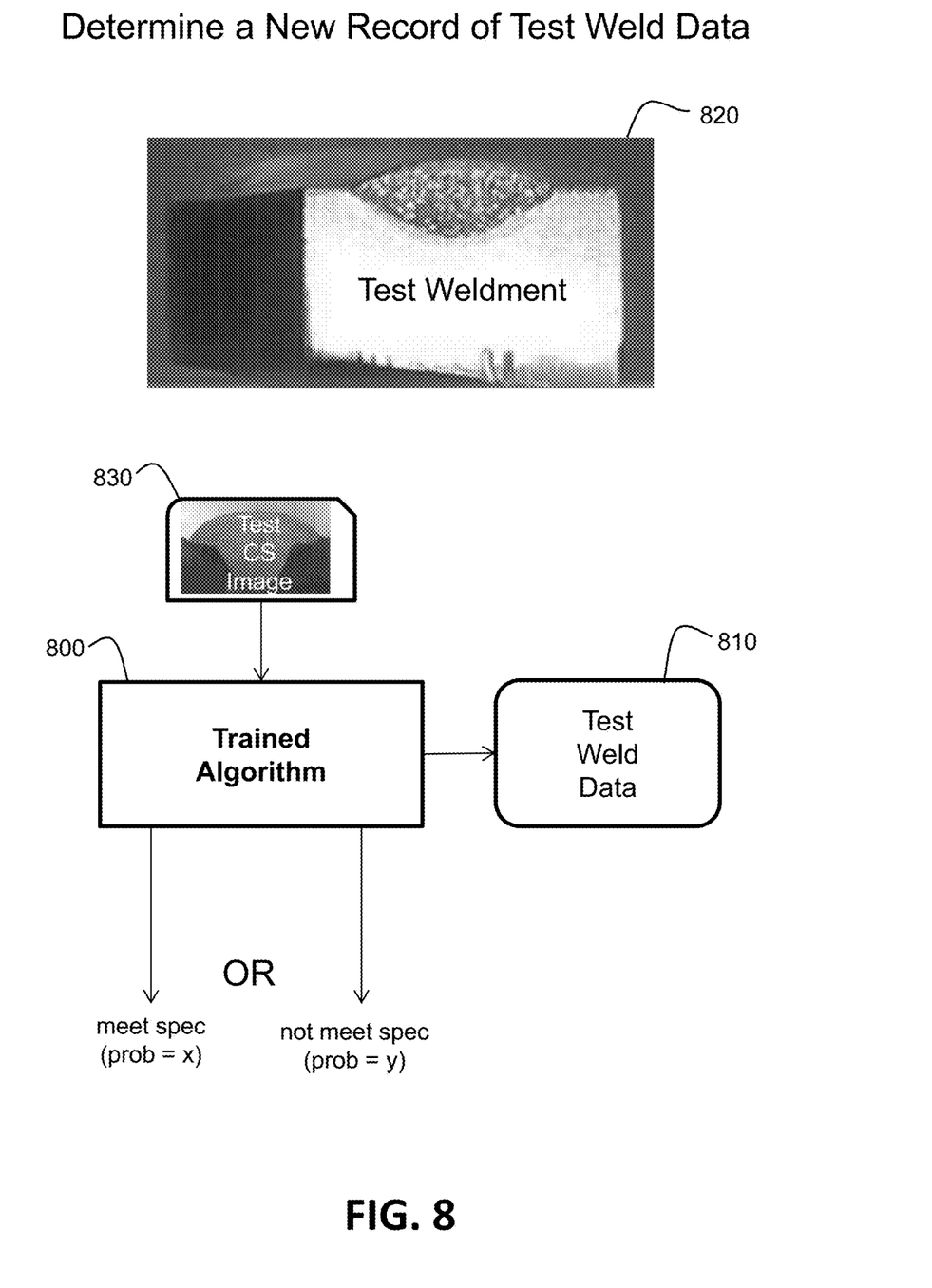
FIG. 8 graphically illustrates an embodiment of a trained algorithm or model trained to determine a new record of test weld data that could have been used to create a test weldment when the algorithm or model is presented with one or more images of cross sections of the test weldment as input.

FIG. 8 graphically illustrates an embodiment of a trained algorithm 800 trained to determine a new record of test weld data 810 that could have been used to create a test weldment 820 when the algorithm 800 is presented with one or more images 830 of cross sections of the test weldment 820 as input. In accordance with one embodiment, the machine learning system 100 includes a learning approach 101 that is programmed to drive the machine learning system 100 to generate the classification algorithm 800 by training on the training data for a plurality of training weldments. The classification algorithm 800 is trained to determine, when at least one image 830 of a cross section of a test weldment 820 is read as input and processed by the algorithm 800, at least one new record of test weld data 810 that could have been used to create the test weldment 820. The algorithm 800 may also be trained to generate a probability that the test weldment 820 meets a specification or does not meet the specification. Again, the specification may be, for example, one of a strength specification, a ductility specification, a hardness specification, a toughness specification, or a percent refinement of bead grain structure specification. In this manner, weld data can be derived from an actual weldment. Furthermore, the likelihood of the weldment meeting a specification can be determined without actually performing a physical test on the weldment. In accordance with another embodiment, the trained algorithm 800 only generates the probability of meeting or not meeting the specification when presented with an image 830. In accordance with yet another embodiment, the trained algorithm 800 only generates the new record of test weld data 810 when presented with an image 830.

In one example, based on the cross-sectional image 810, the algorithm 800 may classify the test weldment 820 as likely resulting in a weldment that would meet a percent refinement of bead grain structure specification with a probability of 65%. In another example, based on another cross-sectional image for another test weldment, the algorithm 800 may classify the other test weldment as likely not resulting in a weldment that would meet the percent refinement of bead grain structure specification with a probability of 75%. In accordance with an alternative embodiment, both a cross-sectional image and the resultant test weld data are used by the algorithm 800 to classify a test weldment as meeting or not meeting a specification.

Figure 9:
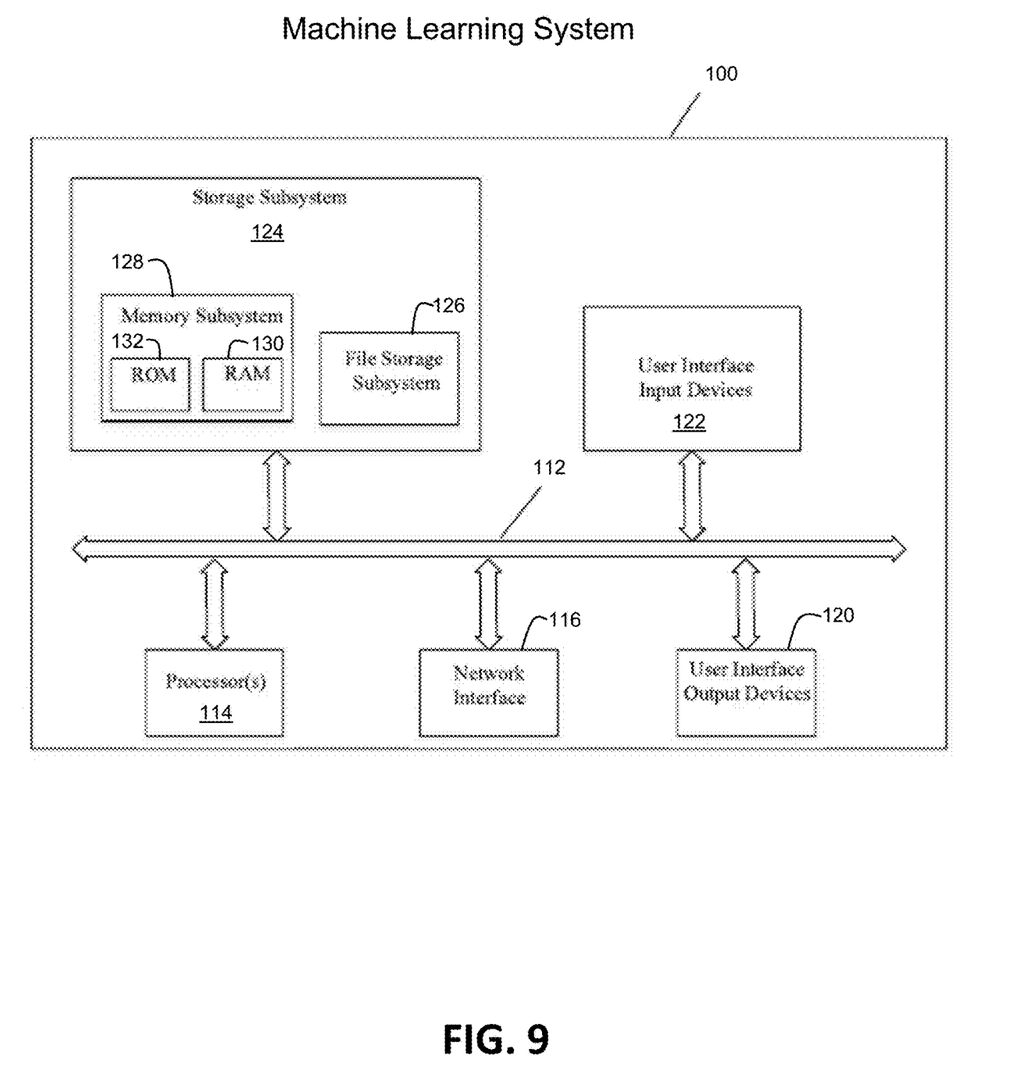
FIG. 9 illustrates an example embodiment of the machine learning system of FIG. 1.

FIG. 9 illustrates an example embodiment of the machine learning system 100 of FIG. 1. The machine learning system 100 includes at least one processor 114 (e.g., a central processing unit, a tensor processing unit, a graphics processing unit) which communicates with a number of peripheral devices via bus subsystem 112. These peripheral devices may include a storage subsystem 124, including, for example, a memory subsystem 128 and a file storage subsystem 126, user interface input devices 122, user interface output devices 120, and a network interface subsystem 116. The input and output devices allow user interaction with the machine learning system 100. Network interface subsystem 116 provides an interface to outside networks and is coupled to corresponding interface devices in other computer systems. In one embodiment, at least one of the processors 114 is a tensor processing unit (TPU) which is an application specific integrated circuit (ASIC) created specifically for machine learning. Unlike a graphics processing unit (GPU), a TPU is structured to accommodate a larger volume of reduced precision computations.

User interface input devices 122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the machine learning system 100 or onto a communication network.

User interface output devices 120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the machine learning system 100 to the user or to another machine or computer system.

Storage subsystem 124 stores programming and data constructs that provide some or all of the functionality described herein. For example, the storage subsystem 124 may include a learning model of a programmed learning approach 101 used by the machine learning system 100 to drive the training of a classification algorithm.

These learning models are often in the form of computer-executable instructions and data that are generally executed by processor 114 alone or in combination with other processors. Memory 128 used in the storage subsystem 124 can include a number of memories including a main random access memory (RAM) 130 for storage of instructions and data during program execution and a read only memory (ROM) 132 in which fixed instructions are stored. A file storage subsystem 126 can provide persistent storage for program and data files, and may include a hard disk drive, a floppy disk drive along with associated removable media, a CD-ROM drive, an optical drive, or removable media cartridges. The computer-executable instructions and data implementing the functionality of certain embodiments may be stored by file storage subsystem 126 in the storage subsystem 124, or in other machines accessible by the processor(s) 114.

Bus subsystem 112 provides a mechanism for letting the various components and subsystems of the machine learning system 100 communicate with each other as intended. Although bus subsystem 112 is shown schematically as a single bus, alternative embodiments of the bus subsystem may use multiple buses.

The machine learning system 100 can be of varying types including a workstation, server, computing cluster, blade server, server farm, or any other data processing system or computing device. Due to the ever-changing nature of computing devices and networks, the description of the machine learning system 100 depicted in FIG. 9 is intended only as a specific example for purposes of illustrating some embodiments. Many other configurations of the machine learning system 100 are possible, having more or fewer components than the machine learning system 100 depicted in FIG. 9.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method comprising:
generating training weld data for each of a plurality of training weldments while creating each of the plurality of training weldments using a welding system;
acquiring a training cross-sectional image for each of the plurality of training weldments, where each training cross-sectional image reveals an internal grain structure of a corresponding training weldment of the plurality of training weldments;
generating truth data for each training weldment of the plurality of training weldments, wherein the truth data indicates that each training weldment of the plurality of training weldments meets a specification or does not meet the specification, wherein the specification is a percent refinement of bead grain structure size with respect to a defined or standard bead grain structure size;
reading the training weld data, the training cross-sectional image, and the truth data for each training weldment of the plurality of training weldments into a memory of a machine learning system as at least one record of training data; and
the machine learning system training a classification algorithm using the at least one record of training data, wherein the classification algorithm is trained to classify a test weldment as meeting the specification or not meeting the specification when at least one test cross-sectional image of the test weldment and at least one record of test weld data used to create the test weldment are processed by the classification algorithm as trained.

2. The method of claim 1, wherein the classification algorithm is trained to generate a probability of the test weldment meeting the specification or not meeting the specification.

3. The method of claim 1, wherein the machine learning system employs supervised learning.

4. The method of claim 1, wherein the machine learning system employs at least one of a linear regression technique, a logistic regression technique, a decision tree technique, a K-Nearest Neighbor technique, a K-means technique, a support vector machine, a neural network, a Bayesian network, a tensor processing unit, a genetic algorithm technique, a learning classifier system, a Gradient Boosting technique, or an AdaBoost technique.

5. The method of claim 1, wherein the at least one record of training data further includes test result data associated with testing at least a portion of the plurality of training weldments, and wherein the test result data includes at least one of bend test data, hardness test data, tensile test data, impact test data, weld metal chemical analysis data, macroetch test data, torque test data, peel test data, break test data, radiography test data, or ultrasonic test data.

6. The method of claim 1, wherein the training weld data and the test weld data include at least one of joint type data, current type data, transfer mode data, base metal data, filler metal data, shielding data, preheat/interpass data, and welding parameter data.

7. The method of claim 6, wherein the welding parameter data includes at least one of welding electrode data, welding current data, welding voltage data, wire feed speed data, electrical stickout data, welding waveform data, weave width data, travel speed data, or welding procedure data.

8. A method comprising:
generating training weld data for each of a plurality of training weldments while creating each of the plurality of training weldments using a welding system;
acquiring a training cross-sectional image for each of the plurality of training weldments, where each training cross-sectional image reveals an internal grain structure of a corresponding training weldment of the plurality of training weldments;
generating truth data for each training weldment of the plurality of training weldments, wherein the truth data indicates that each training weldment of the plurality of training weldments meets a specification or does not meet the specification, wherein the specification is a percent refinement of bead grain structure size with respect to a defined or standard bead grain structure;
reading the training weld data, the training cross-sectional image, and the truth data for each training weldment of the plurality of training weldments into a memory of a machine learning system as at least one record of training data; and
the machine learning system training a classification algorithm using the at least one record of training data, wherein the classification algorithm is trained to classify a sample set of weld data for creating a sample weldment, when processed by the classification algorithm as trained, as resulting in a sample weldment that would meet the specification or would not meet the specification were the sample set of weld data used to create the sample weldment.

9. The method of claim 8, wherein the classification algorithm is trained to generate a probability that the sample set of weld data would result in the sample weldment meeting the specification or not meeting the specification.

10. The method of claim 8, wherein the at least one record of training data further includes test result data associated with testing at least a portion of the plurality of training weldments, and wherein the test result data includes at least one of bend test data, hardness test data, tensile test data, impact test data, weld metal chemical analysis data, macroetch test data, torque test data, peel test data, break test data, radiography test data, or ultrasonic test data.

11. The method of claim 8, wherein the machine learning system employs supervised learning.

12. The method of claim 8, wherein the machine learning system employs at least one of a linear regression technique, a logistic regression technique, a decision tree technique, a K-Nearest Neighbor technique, a K-means technique, a support vector machine, a neural network, a Bayesian network, a tensor processing unit, a genetic algorithm technique, a learning classifier system, a Gradient Boosting technique, or an AdaBoost technique.

13. The method of claim 8, wherein the training weld data and the sample set of weld data include at least one of joint type data, current type data, transfer mode data, base metal data, filler metal data, shielding data, preheat/interpass data, and welding parameter data.

14. The method of claim 13, wherein the welding parameter data includes at least one of welding electrode data, welding current data, welding voltage data, wire feed speed data, electrical stickout data, welding waveform data, weave width data, travel speed data, or welding procedure data.

15. A method comprising:
generating training weld data for each of a plurality of training weldments while creating each of the plurality of training weldments using a welding system;
acquiring a training cross-sectional image for each of the plurality of training weldments, where each training cross-sectional image reveals an internal grain structure of a corresponding training weldment of the plurality of training weldments;
generating truth data for each training weldment of the plurality of training weldments, wherein the truth data indicates that each training weldment of the plurality of training weldments meets a specification or does not meet the specification, wherein the specification is a percent refinement of bead grain structure size with respect to a defined or standard bead grain structure size;
reading the training weld data, the training cross-sectional image, and the truth data for each training weldment of the plurality of training weldments into a memory of a machine learning system as at least one record of training data; and
the machine learning system training a classification algorithm using the at least one record of training data, wherein the classification algorithm is trained to determine at least one new record of test weld data that could have been used to create a test weldment when at least one image of a cross section of the test weldment is processed by the classification algorithm as trained.

16. The method of claim 15, wherein the classification algorithm is trained to generate a probability that the test weldment meets the specification or does not meet the specification.

17. The method of claim 15, wherein the at least one record of training data further includes test result data associated with testing at least a portion of the plurality of training weldments, and wherein the test result data includes at least one of bend test data, hardness test data, tensile test data, impact test data, weld metal chemical analysis data, macroetch test data, torque test data, peel test data, break test data, radiography test data, or ultrasonic test data.

18. The method of claim 15, wherein the training weld data and the at least one new record of test weld data includes at least one of joint type data, current type data, transfer mode data, base metal data, filler metal data, shielding data, preheat/interpass data, and welding parameter data.

19. The method of claim 18, wherein the welding parameter data includes at least one of welding electrode data, welding current data, welding voltage data, wire feed speed data, electrical stickout data, welding waveform data, weave width data, travel speed data, or welding procedure data.

* * * * *